United States Patent Office

2,859,186
Patented Nov. 4, 1958

2,859,186

RESINOUS TRIMETHYLOL PHENOL-PHENOL-POLYAMINE CONDENSATION PRODUCTS WITH ANION EXCHANGING PROPERTIES

Carl Boresch, Leverkusen-Wiesdorf, and Walter Hagge and Mathieu Quaedvlieg, Leverkusen-Bayerwerk, Germany, assignors to Farbenfabriken Bayer Aktiengesellschaft, Leverkusen, Germany, a corporation of Germany No Drawing. Application May 6, 1955
Serial No. 506,656

Claims priority, application Germany May 17, 1954

6 Claims. (Cl. 260—2.1)

The present invention relates to a process for the production of synthetic resins with anion exchanging properties.

The present invention provides a process for the production of synthetic resins with anion exchanging properties by the condensation of phenols, aliphatic compounds containing a plurality of primary amino groups and formaldehyde, wherein a phenol is first reacted with formaldehyde to form a trimethylol phenol, using the formaldehyde in a slight excess of the amount which is theoretically necessary, and the trimethylol phenol is then condensed with a phenol and an aliphatic compound containing a plurality of primary amino groups to form an insoluble resin, and if desired this resin is further condensed with a polyfunctional compound which is capable of reacting with both aliphatic amines and phenols.

Examples of phenols which can be condensed with formaldehyde to provide trimethylol phenols by this process are phenol and m-cresol.

Examples of phenols which are suitable for the reaction with the trimethylol phenols in the above-mentioned process are those aromatic compounds which contain hydroxyl groups attached to the nucleus and which contain 2 or 3 unsubstituted carbon atoms in the p-position and/or o-position to the hydroxyl group.

Suitable aliphatic amines are ethylene diamine, diethylene triamine, tetraethylene pentamine and polyethylene imine.

Polyfunctional compounds which can be used in the process of the invention are epichlorohydrin, dichlorohydrin, dichloroethyl ether and ethylene chloride.

The process is preferably carried out by reacting approximately 1 mol of a phenol in strongly alkaline aqueous solution with about 3.5–4.5 mols of formaldehyde at a temperature in the region of 20–50° C. to form the corresponding trimethylol phenol. About 1–5 mols of one of the aliphatic amines and also about 1 mol of one of the phenols are then added to the reaction solution, and the solution is heated to a temperature between about 50 and 100° C. until the solution is converted into a gel. The gel is converted into an insoluble resin in the conventional manner by heating it to a temperature between 70° C. and its carbonisation temperature, preferably to about 110–130° C. If it is desired that this resin be subjected to further condensation, this can be carried out, for example, by converting the resin into the hydroxyl form by treatment in an alkaline medium and thereafter reacting the product with the above-mentioned polyfunctional compounds, preferably at elevated pressure and at a temperature of about 100–130° C.

The ion exchange resins obtained by this process are characterised by having higher mechanical and chemical stability than the corresponding resins which are obtained without the intermediate stage of forming the trimethylol phenol.

The following examples further illustrate the invention:

*Example 1*

95 g. of phenol are dissolved in 310 cc. of 40% formaldehyde and mixed while stirring at 30–40° C. with 65 cc. of concentrated sodium hydroxide over a period of 30 minutes. The solution is kept for 15 hours at 40° C. and thereafter 95 g. of phenol and 190 g. of tetraethylene pentamine are added, and the mixture is converted by continued heating at 80–90° C. into a gel, which is dried for 24 hours at 120° C. The resin thus obtained is swelled in 5% sulphuric acid, regenerated with 2% sodium hydroxide solution, thereafter maintained for 1 hour at 120° C. with 200 g. of ethylene chloride under pressure, and finally washed.

*Example 2*

95 g. of phenol are dissolved in 310 cc. of 40% formaldehyde and mixed while stirring at 30–40° C. with 75 cc. of concentrated sodium hydroxide over a period of 30 minutes. The mixture is then left to stand for 15 hours at room temperature. 95 g. of phenol are thereafter added while stirring and 150 g. of ethylene diamine are run in over a period of 30 minutes with the temperature raised to 60° C. This solution is heated for 20 hours at 80–90° C. under reflux and while stirring, and the gel obtained is dried for 48 hours at 120° C. After being ground, the resin obtained is swelled in 5% sulphuric acid, washed, regenerated with 2% sodium hydroxide solution, and again washed.

*Example 3*

95 g. of phenol are dissolved in 80 cc. of 40% formaldehyde and thereafter mixed while stirring with 90 g. of paraformaldehyde. 65 cc. of concentrated NaOH solution are added to the resulting solution over a period of 30 to 40 minutes at 30–40° C. The solution is then stirred until it becomes clear. The solution is then kept for 15 hours at 40° C. without stirring. The initial condensate obtained in this manner is transformed into a resin, as indicated in Example 2, by reaction with phenol and ethylene diamine.

What we claim is:

1. A process for preparing an anion-exchange resin which comprises contacting 1 mol of a monohydric phenol capable of forming a trimethylol derivative in an aqueous caustic alkaline solution with about 3.5–4.5 mols of formaldehyde to produce an aqueous solution of the trimethylol derivative of said monohydric phenol, mixing about 1 mol of a monohydric phenol in which at least two of the hydrogen atoms in p- and o-position to the phenolic hydroxyl group are unsubstituted and about 1–5 mols of an alkylene polyamine with said solution, thereafter heating said solution to temperatures of about 50 to 100° C. to convert said solution into a gel and drying said gel to produce a resin with anion exchange properties.

2. A process according to claim 1, wherein the resin is further condensed with an aliphatic compound containing as sole reactive substituents more than one chlorine atom.

3. A process according to claim 1, wherein the resin is further condensed with an aliphatic compound containing as sole reactive substituents an epoxy group and a chlorine atom.

4. A synthetic resin produced by the process of claim 3.

5. Synthetic resins produced by the process claimed in claim 1.

6. Synthetic resins produced by the process claimed in claim 2.

References Cited in the file of this patent

UNITED STATES PATENTS

| | | |
|---|---|---|
| 2,362,086 | Myers et al. | Nov. 7, 1944 |
| 2,402,384 | Eastes | June 18, 1946 |
| 2,521,288 | Evers | Sept. 5, 1950 |
| 2,585,196 | Walton | Feb. 12, 1952 |
| 2,609,352 | Kvalnes | Sept. 2, 1952 |